J. J. TATUM.
BRAKE BEAM SUPPORT.
APPLICATION FILED MAR. 8, 1919.

1,385,730.

Patented July 26, 1921.

Inventor
John J. Tatum

UNITED STATES PATENT OFFICE.

JOHN J. TATUM, OF BALTIMORE, MARYLAND.

BRAKE-BEAM SUPPORT.

1,385,730.  Specification of Letters Patent.  Patented July 26, 1921.

Application filed March 8, 1919. Serial No. 281,487.

*To all whom it may concern:*

Be it known that I, JOHN J. TATUM, a citizen of the United States, residing at Baltimore, Maryland, have invented a certain new and useful Improvement in Brake-Beam Supports, of which the following is a full, clear, and exact description, such as will enable others skilled in the art to which it appertains to make and use the same, reference being had to the accompanying drawings, forming part of this specification.

My invention relates generally to railway car brakes and more particularly to a support for the brake beam or brake shoes, the principal object of my invention being to provide a relatively simple, inexpensive and efficient support for a brake beam and the shoes carried thereby and which will be effective in providing for the uniform wear of brake shoes, thereby materially lengthening the life or periods of service of the shoes and consequently reducing the cost incident to replacement of worn shoes. Further objects of my invention are to provide a support which will eliminate the usual brake hangers and parts directly associated therewith, thereby greatly simplifying the brake rigging and particularly the brake beam supporting means.

With the foregoing and other objects in view, my invention consists in certain novel features of construction and arrangement of parts, hereinafter more fully described, and claimed, and illustrated in the accompanying drawings, in which—

Figure 1:
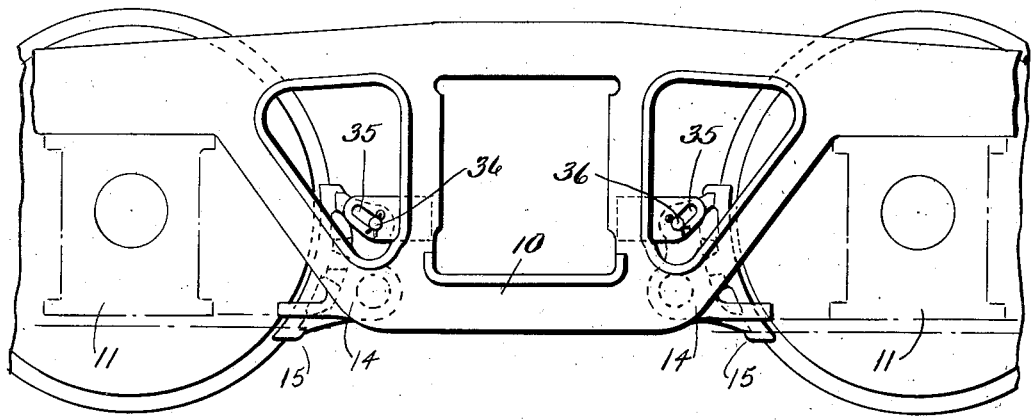
Figure 1 is a side elevational view of the side frame of a truck, the same being provided with my improved brake beam support.
Figure 2:
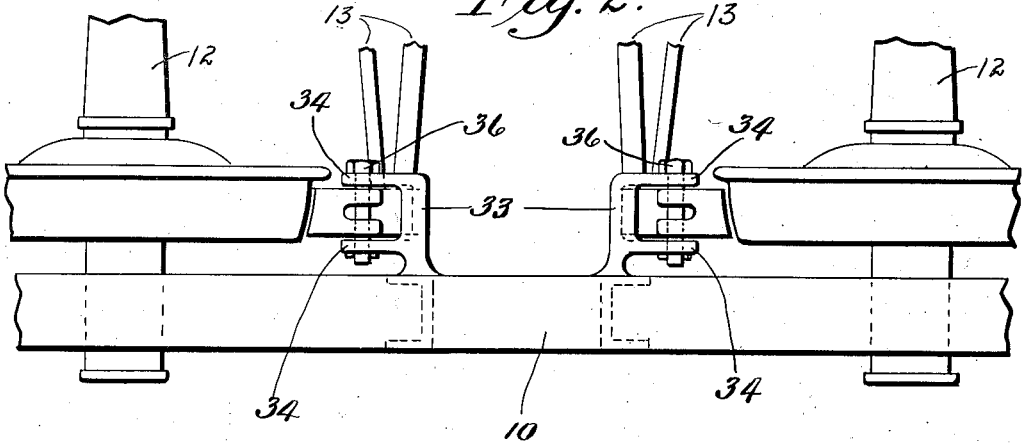
Fig. 2 is a plan view of a portion of the truck, the side frame of which is equipped with my improved support.

Referring by numerals to the accompanying drawings which illustrate a practical embodiment of my invention, 10 designates a truck side frame, 11 the journal boxes associated therewith, 12 the wheel carrying axles, 13 the brake beams which may be of any desired type and said beams carrying on their ends the usual heads 14 and shoes 15, the latter being adapted to directly engage the peripheries of the car wheels.

The truck side frame is provided on the lower portion of its innner face with inwardly projecting brackets 33, the same being preferably formed integral with said side frame or they may be separately formed and rigidly fixed to the frame in any suitable manner.

Formed integral with each bracket is a pair of substantially parallel ears 34, the same being spaced apart and projecting toward the adjacent car wheel, and each pair of ears being provided with inclined slots 35. These slots receive pins or bolts 36 which are carried by the brake heads or parts associated therewith.

A brake beam support of my improved construction is comparatively simple, can be easily and cheaply manufactured, is very efficient in use, and materially decreases the number of parts necessary to properly support brake beams.

It will be readily understood that minor changes in the size, form and construction of the various parts of my improved brake beam support can be made and substituted for those herein shown and described, without departing from the spirit of my invention, the scope of which is set forth in the appended claims.

I claim:

1. The combination with a car truck frame and the brake beams associated therewith, of brackets projecting inwardly from the wheel pieces of the truck frame, which brackets are provided with openings adapted to receive brake heads, said brackets being provided with inclined slots, and bearing members carried by said brake heads and loosely arranged in said slots whereby the brake heads are free to move toward the wheels when the brakes are applied and to move away from the wheels by gravity when the brakes are released.

2. The combination with a car truck and the brake beams associated therewith, of brackets projecting inwardly from the wheel pieces of the truck frame, a pair of plates projecting from each bracket toward the adjacent wheel, said plates being provided with inclined slots, brake heads mounted between the pairs of plates, and bearing members carried by the brake heads and loosely arranged in said slots.

3. The combination with a brake beam and the brake heads thereon, of a brake beam support comprising brackets projecting inwardly from a truck side frame, said brackets and brake heads having interengaging parts, and connections between said brackets and brake heads whereby the latter have sliding engagement with said brackets.

4. The combination with a brake beam and the brake heads thereon, of a support for said brake beam, which support comprises brackets projecting inwardly from a truck side frame, and said brackets and brake heads having interengaging parts connected so as to permit the brake heads to have sliding engagement with said brackets.

5. A support for a brake beam and the brake heads thereon, which support comprises brackets projecting inwardly from a truck side frame, said brackets and brake heads having interengaging parts, and means for maintaining the brake heads in sliding engagement with said brackets.

6. The combination with a car truck and the brake beams associated therewith, of supports for said brake beams, which supports comprise brackets projecting inwardly from the side frames of the truck, and said brackets having interengaging sliding connections with the brake heads carried by the brake beam.

7. The combination with a car truck and the brake beams associated therewith, of supports for said brake beams, which supports comprise brackets projecting inwardly from the side frames of the truck, said brackets having interengaging sliding connections with the brake heads carried by the brake beam, and means for retaining said brake heads in engagement with said brackets.

8. The combination with a brake beam and the brake heads thereon, of a support for said brake beam, which support comprises brackets projecting inwardly from a truck side frame, said brackets being bifurcated to receive the brake heads, and connections between said bifurcated brackets and brake heads which permit said brake heads to slide upon said bifurcated brackets.

9. A support for a brake beam and the brake heads carried thereby, said support comprising brackets projecting inwardly from a truck side frame, said brackets being bifurcated to receive the brake heads, and means for maintaining the brake heads in sliding engagement with said brackets.

In testimony whereof I hereunto affix my signature this 3rd day of March, 1919.

JOHN J. TATUM.